(12) United States Patent
Huang et al.

(10) Patent No.: US 6,189,381 B1
(45) Date of Patent: Feb. 20, 2001

(54) ANGULAR RATE SENSOR MADE FROM A STRUCTURAL WAFER OF SINGLE CRYSTAL SILICON

(75) Inventors: Yongli Huang, San Jose; Martin Lim, San Mateo; Tariq M. Haniff, Campbell; Weijie Yun, San Jose, all of CA (US)

(73) Assignee: SiTek, Inc., Sylmar, CA (US)

( * ) Notice: Under 35 U.S.C. 154(b), the term of this patent shall be extended for 0 days.

(21) Appl. No.: 09/299,472

(22) Filed: Apr. 26, 1999

(51) Int. Cl.$^7$ .................................................. G01C 19/00
(52) U.S. Cl. ........................................................ 73/504.12
(58) Field of Search ........................ 73/504.12, 504.13, 73/504.14, 504.15, 504.16

(56) References Cited

U.S. PATENT DOCUMENTS

| | | | |
|---|---|---|---|
| Re. 33,479 | 12/1990 | Juptner et al. | 73/504.16 |
| 5,226,321 | 7/1993 | Varnham | 73/504.13 |
| 5,492,596 | 2/1996 | Cho | 156/632.1 |
| 5,505,084 | 4/1996 | Greiff et al. | 73/504.14 |
| 5,530,342 | 6/1996 | Murphy | 324/158.1 |
| 5,537,872 | 7/1996 | Frere et al. | 73/504.12 |
| 5,889,207 | * 3/1999 | Lutz | 73/504.13 |

OTHER PUBLICATIONS

William A. Clark, Rogert T. Howe, and Roberto Horowitz; "Surface Micromachined Z–Axis Vibratory Rate Gyroscope;" *Solid–State Senor and Actuator Workshop* Jun. 2–6, 1996, pp. 283–287.

\* cited by examiner

*Primary Examiner*—John E. Chapman
(74) *Attorney, Agent, or Firm*—Jerry G. Wright; Flehr Hohbach Test Albritton & Herbert LLP (57) ABSTRACT

An angular rate sensor made from a structural wafer of single crystal silicon has a pair of proof masses lying in an X-Y plane and supported by a circular frame. The masses are driven into oscillation in the X-direction using an interdigitated comb drive. Rotation of the sensor about the Z-axis induces Coriolis forces which cause the frame to rotate, the rotation of the frame being indicative of the angular rate of the sensor. A parallel plate sensor located outside of the circular frame senses rotation of the frame.

4 Claims, 7 Drawing Sheets

ANGULAR RATE SENSOR MADE FROM A STRUCTURAL WAFER OF SINGLE CRYSTAL SILICON

INTRODUCTION

The present invention relates to an angular rate sensor and specifically one which detects the rate of rotation using the Coriolis effect.

BACKGROUND

Rotational rate sensors based on the Coriolis effect have been commercially produced in the form of a microminiature double-ended quartz tuning forks. Such vibrating quartz tuning forks are generally composed of a single wafer of monocrystalline piezoelectric quartz. One use of such a rate sensor is as a yaw sensor in a motor vehicle. Because of the above use in automotive applications it is desired to have a device which is the most economical, miniaturized, and which is compatible with other semiconductive components of the automobile.

Silicon devices have been proposed but as yet have not become commercially available because of processing difficulties compared to the commercial quartz-based device. For example, one type of silicon device is constructed of polycrystalline silicon whose limited thickness is detrimental to sensitivity.

OBJECT AND SUMMARY OF INVENTION

It is therefore the general object of the present invention to provide an improved rate sensor utilizing which is responsive to a Coriolis force.

In accordance with the above object there is provided a method of making an angular rate sensor from a structural wafer of single crystal silicon, the structural wafer having at least one proof mass, which is part of a rotating reference frame, the mass lying substantially in an X-Y plane which is oscillated or driven in the X direction and responds to a Z-axis input rotation to deflect at least partially in the Y direction, where Coriolis acceleration is sensed. The method comprises the steps of providing a silicon wafer handle to implement processing, bonding the handle wafer to the structural wafer and vertically etching through at least the structural wafer to provide sensing and drive means. Both the silicon handle and structural wafers have an identical expansion rate.

From a structural point-of-view, there is provided an angular rate sensor comprised of a structural wafer composed of single crystal silicon and having a pair of proof masses which are part of a rotating reference frame, the masses lying substantially in an X-Y plane orthogonal to a Z input axis of rotation. Interdigitated comb drive means included in the structural wafer drive the masses into oscillation in an X or Y direction. Frame means are included in the structural wafer in the X-Y plane for supporting the masses and allowing opposing Coriolis induced forces to rotate the frame, the rotation of the frame being indicative of the angular rate of the sensor. Parallel plate sensing means located outside of the circular frame also in the X-Y plane sense the rotation of the frame.

BRIEF DESCRIPTION OF THE DRAWINGS

FIG. 3A through 3L are cross-sectional views of processing steps used to produce the embodiment specifically of FIG. 2 and which may be modified somewhat to produce the embodiment of FIG. 1.

DESCRIPTION OF PREFERRED EMBODIMENTS

Figure 1:
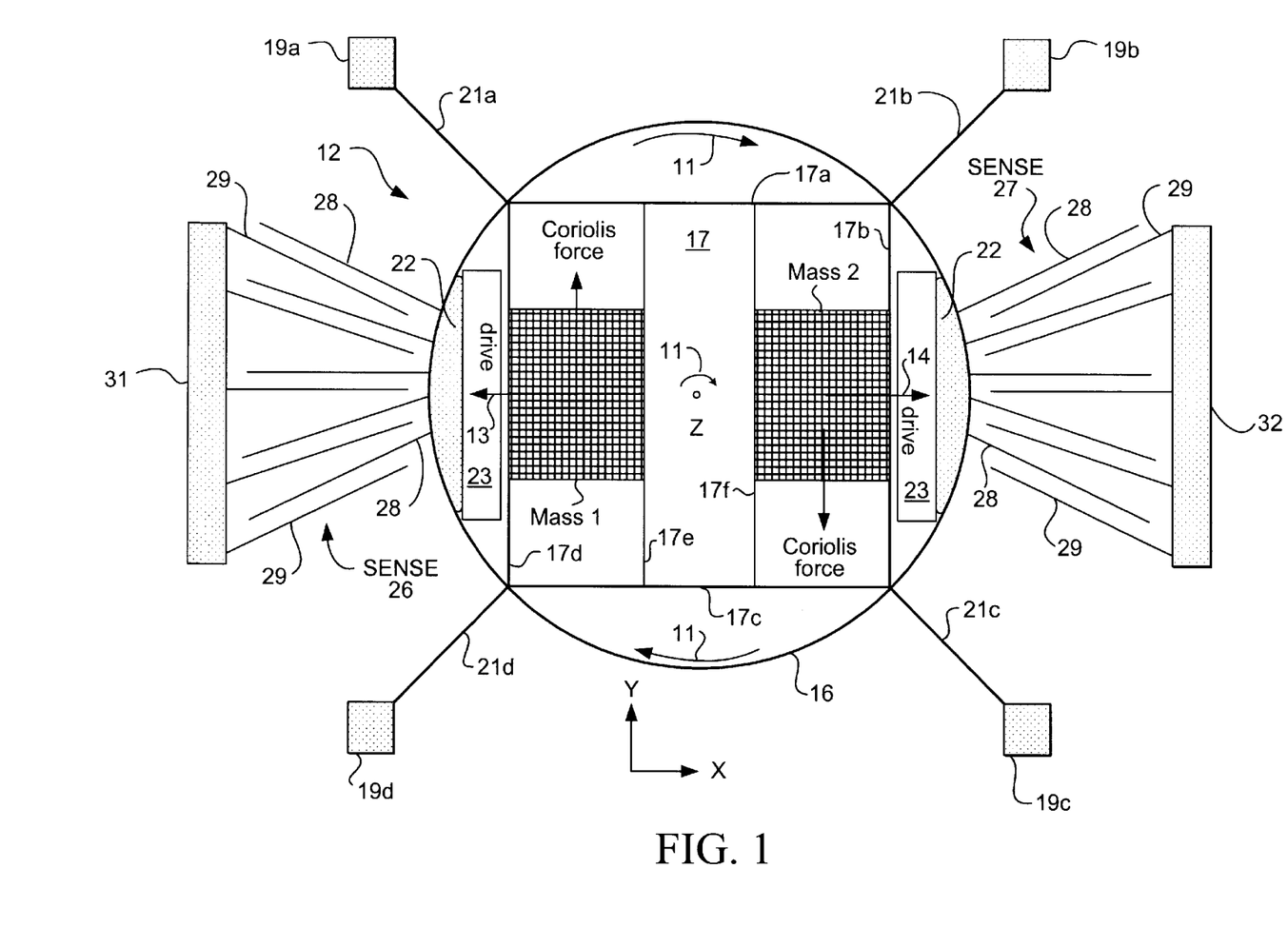
FIG. 1 is a plan view of a one-embodiment of a rate sensor of the present invention.

FIG. 1 illustrates one embodiment of the invention which is a form of Z-axis vibratory rate gyroscope. That is, it responds to a Z-axis Coriolis input rotation as indicated by the arrow 11. A rotating reference frame 12 is composed of semiconductive material of single crystal silicon, which through micro-machining techniques as described below provides an angular rate sensor which lies essentially in an X-Y plane as indicated on the drawing of FIG. 1. The sensor includes the two proof masses designated Mass 1 and Mass 2, which lie substantially in the X-Y plane orthogonal to the Z-axis which is the input axis of rotation. The reference motion for sensing Coriolis acceleration is generated by oscillating or driving the proof masses in anti-phase +X and −X directions as indicated by the respective arrows 13 and 14 (the X direction is of course really for convenient reference; it could well be in the Y direction) and sensing motion in the Y direction. The actual X direction drive occurs in conjunction with a frame 16 (circular or any convenient shape) which surrounds the masses 1 and 2, and supports them by a rectangular-type beam structure 17 having the four beams of 17a, 17b, 17c and 17d. Mass 1 is supported between 17d and an interior beam 17e; Mass 2 between beam 17b and an interior beam 17f. The rectangular beam structure 17 is an integral part of the circular frame 16. The frame itself is supported at four points or anchors 19a, 19b, 19c, and 19d which are connected to the frame by the associated spokes 21a–21d at the corners of the square support frame 17. Fewer or more support points may be used.

Figure 4:
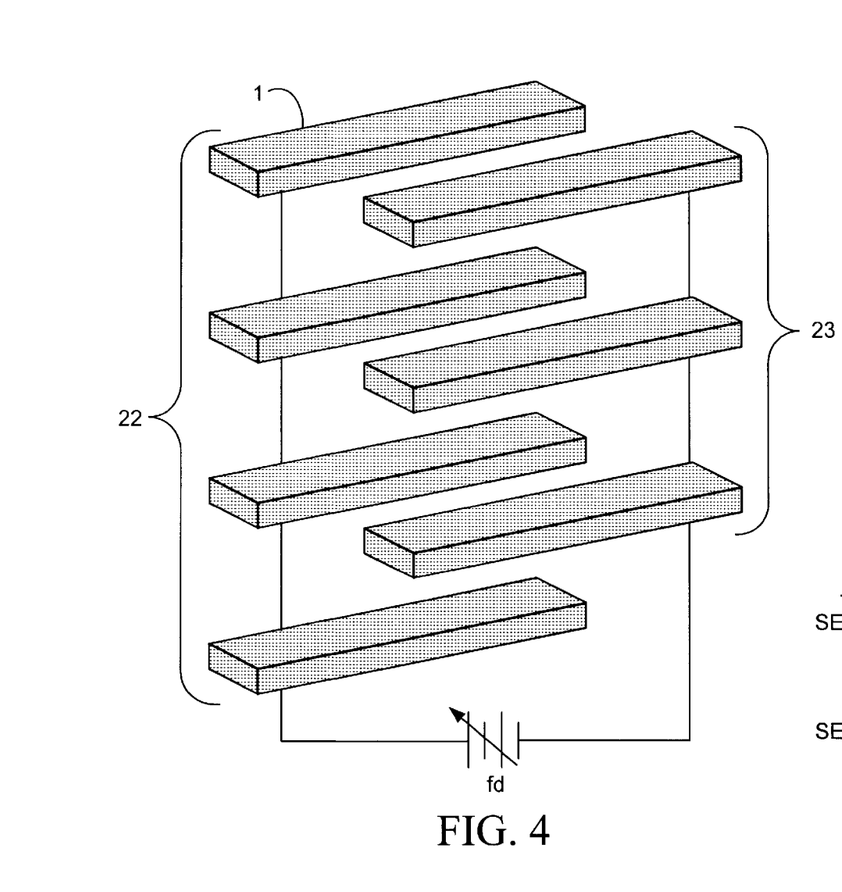
FIG. 4 is a perspective view of a drive portion of either FIG. 1 or FIG. 2.

The details of the drive structure to produce the drive directions 13 and 14 are clearly illustrated in FIG. 4 where the interdigitated fingers 22 are an integral part of the circular frame 16 and the group of fingers 23 are fixed to a stationary reference or anchor. These are driven at a frequency, $f_d$, as indicated by the symbolic variable battery.

Figure 5:
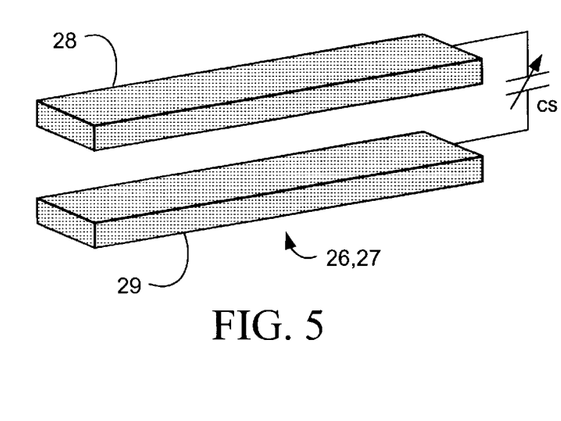
FIG. 5 is a perspective view of a sensing portion of either FIG. 1 or FIG. 2.

To sense the amount of rotation of frame 16 (which of course includes a Y component), parallel plate capacitor sensing means are located outside of the circular frame 16 as indicated by the sense beams 26 and 27. A typical pair of the sense plates or fingers is indicated in FIG. 5 along with a symbolic variable capacitor, $C_s$. Again as in the case of the interdigitated drive units illustrated in FIG. 4, sense fingers 28 or parallel plates are attached to the rotating frame 16 and fingers 29 to fixed anchors 31 and 32.

Figure 6:
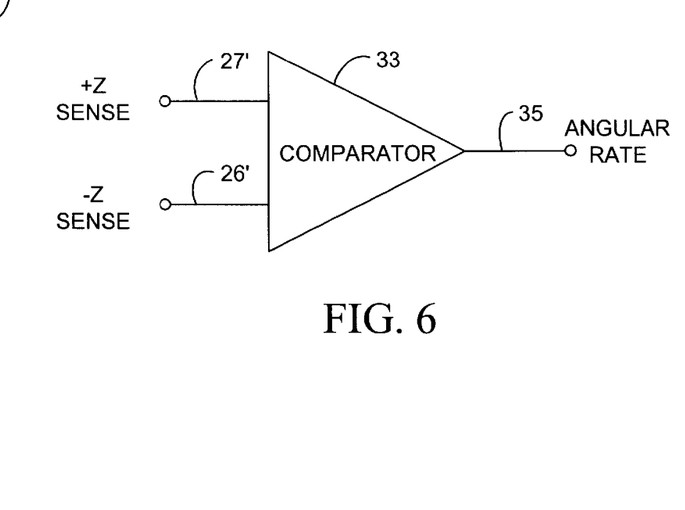
FIG. 6 is a schematic diagram for processing signals from the sensing portion of FIGS. 1 or 2.

In operation, due to the anti-phase drive of a two-mass system, opposing Coriolis induced forces create a torque in the direction 11 around the Z-axis which rotates the entire reference frame 12 and the circular support structure 16. The fingers 28 of sense or detection means 26 and 27 are attached and part of frame 16 and rotate in the direction illustrated to create a capacitance change. In other words, the fingers either are further apart or closer together (that is a +Z or a −Z direction). This capacitance change is differentially sensed as illustrated in FIG. 6 by the comparator 33 which has as a +Z input 27' the combined capacitance from the sense fingers 27 and a −Z input 26' from the sense fingers 26. The output 35 of the comparator is thus the angular rate.

From an operational point-of-view, it is believed that the four point suspension is optimum for the unique rotary motion of the semiconductive circular frame 16 with its Coriolis induced displacements. The external sense fingers 26 and 27 which are outside of the main portion of the rotating reference frame 12, in addition to providing the differential capacitive effect (which results in much greater sensitivity to movement) allows the individual fingers 28 and 29 to have a longer length thus to provide a greater area to enhance the capacitance effect. In addition since they are external from the main rotating structure, circuit connections in an integrated silicon semiconductive wafer are facilitated (specifically, as will be discussed below no interior oxide insulating layer need be included in a handle wafer). For example, as discussed above, this device might be used as part of a feedback control system to sense yaw in an automobile.

As will be discussed below, both the drive fingers 22, 23, and the sensing fingers 26, 27 also provide a thicker structure (i.e., a greater aspect ratio) providing more area because of the novel semiconductive micro-machining techniques of the present invention. For example, referring to FIGS. 4 and 5 the thickness of the fingers are at least 10 microns providing greater area and greater mass for greater sensitivity due to confining of bending to the X-Y plane. A minimum thickness of at least 10 microns provides improved sensitivity. However, 70 microns and greater is preferred for higher sensitivity and to suppress out-of-plane displacement. Previous techniques, for example where a polysilicon is utilized, could only provide thicknesses of 2 to 5 microns.

Finally, from an operational point-of-view, the entire structure of FIG. 1 lies in an X-Y plane and vibrates in an X-Y plane. This is because with the input rate of rotation around the Z-axis and the drive $f_d$, in the X-axis (or Y), sensing must be orthogonal to both.

As discussed above, the high aspect ratio minimizes Z-axis movement.

Figure 2:
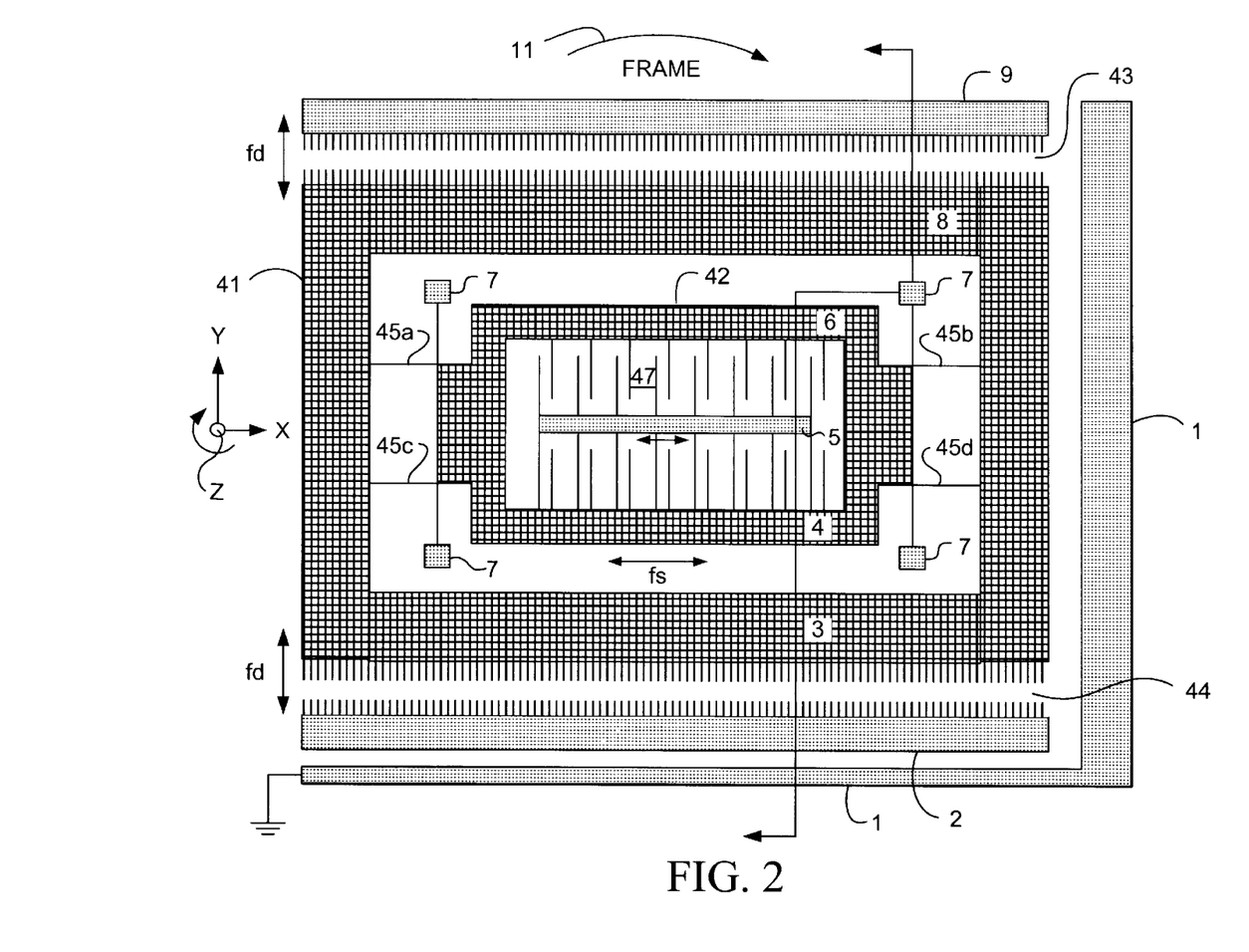
FIG. 2 is another embodiment of the rate sensor of the present invention.

FIG. 2 illustrates another embodiment of a rate sensor, also composed of a single crystal of silicon material which is driven in a Y-axis direction, designated $f_d$, in response to a Coriolis induced force around the Z-axis. Rate is sensed in the X-axis direction, designated $f_s$. Drive $f_d$ is accomplished by interdigitated combs as illustrated in FIGS. 4; sensing by parallel plate fingers as illustrated in FIG. 5.

The rotation of the reference frame is again indicated as 11 around the Coriolis axis of rotation Z. There are a pair of masses the first being outer rectangular frame 41 and then concentric with that and on its interior is another rectangular frame 42. Frame 41 is driven by means of the interdigitated combs 43 and 44, respectively, in the direction as indicated by the $f_d$ arrows. A general ground anchor is shown at 1 and then anchors 2 and 9 are for the drive structures 44, 43, respectively. The other portions of the interdigitated combs are attached to the outer mass 41. Inner mass 42 is connected to the outer mass 41 by the four beams 45a, 45b, 45c, and 45d. Inner mass 42 is also supported by the four structural anchors 7. To sense the induced Coriolis acceleration or movement of inner mass 42 with respect to a structural sense anchor 5 the interdigitated comb sense structure 47 is provided. Thus these pairs of fingers (see FIG. 5) respond to movement in the X direction (that is the $f_s$ direction), the change in capacitance being a measure of rotation rate.

Differential sensing (see FIG. 6) may be done by inserting extra plates on the opposite side of the plates anchored at 5. However, they must be connected to an electrically isolated bus which can be provided by a handle wafer with an interior oxide insulating layer.

The process of construction of the embodiment of FIG. 2 is specifically illustrated in FIGS. 3A through 3L. And these will be related specifically to the numerical legends 1 through 9 illustrated in FIG. 2. The construction process of FIG. 2 while specific to that embodiment also is easily modified for the embodiment of FIG. 1. That is the same type of masses are provided, the suspension beams to the anchors are similar, and most importantly the interdigitated drive combs and parallel plate fingers have a sufficient thickness, for example 70 microns or more of the individual fingers for increased sensitivity both in the drive and sense modes.

Figure 3A:
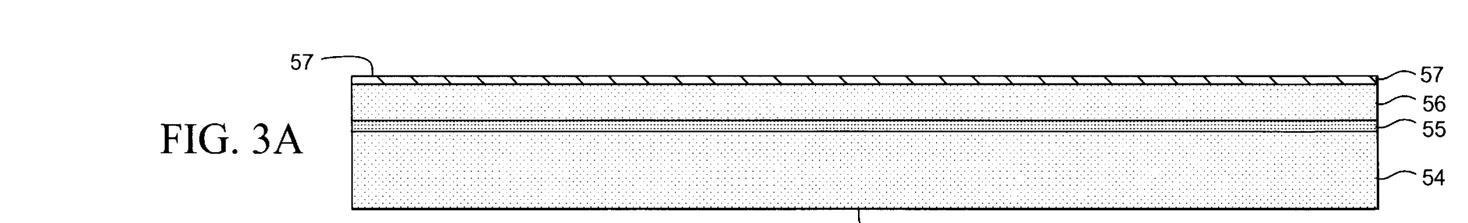
Figure 3B:
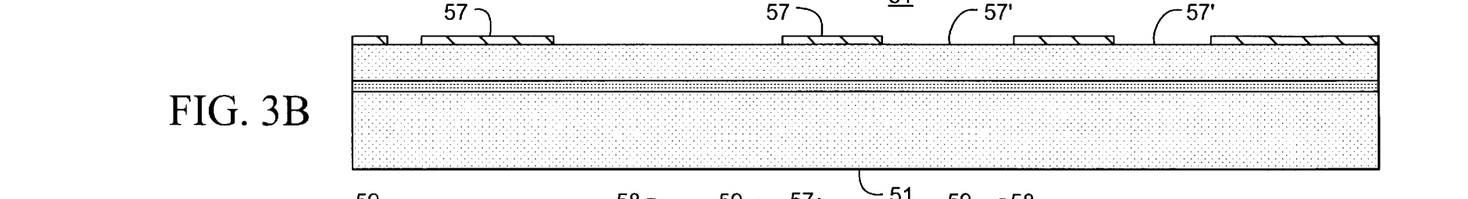
Figure 3C:
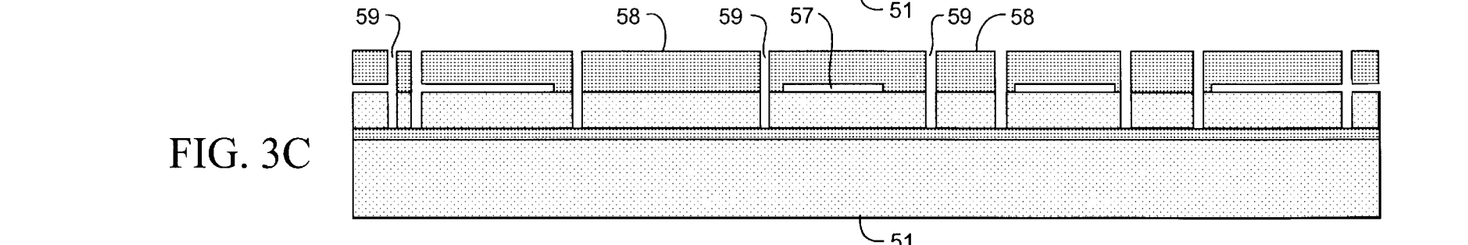
Figure 3D:
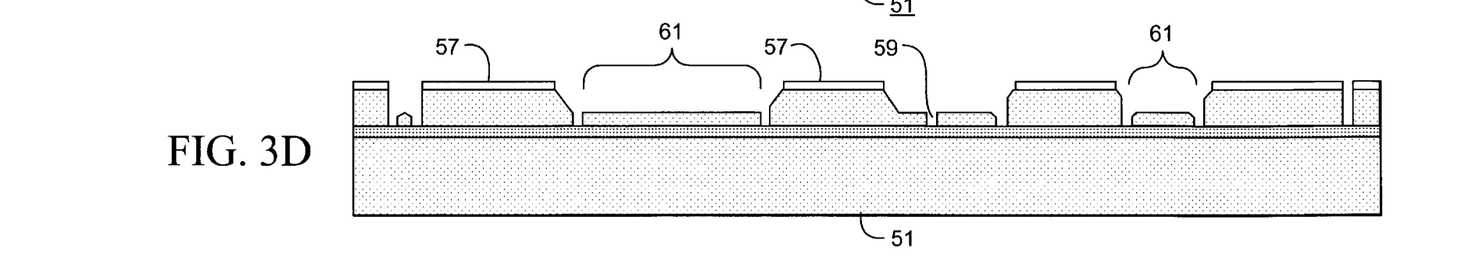
Figure 3E:
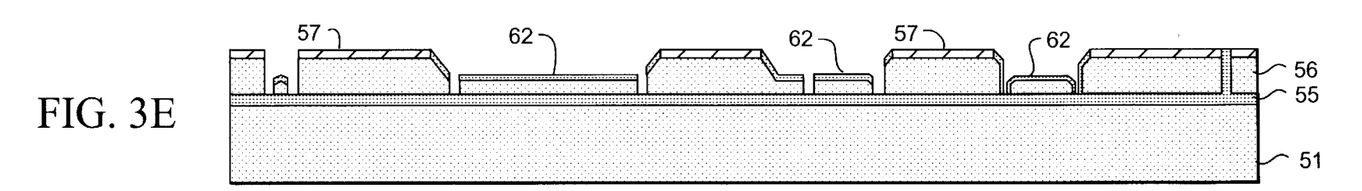
Figure 3F:
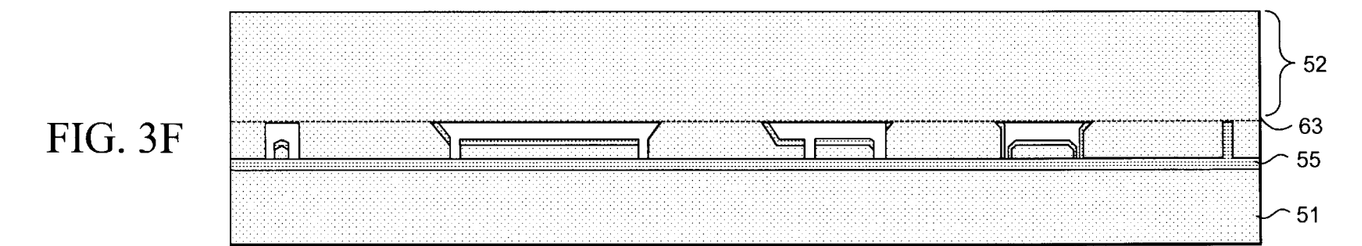
Figure 3G:
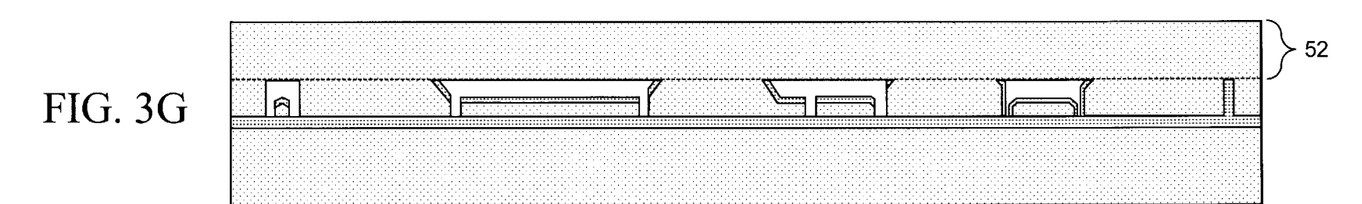
Figure 3H:
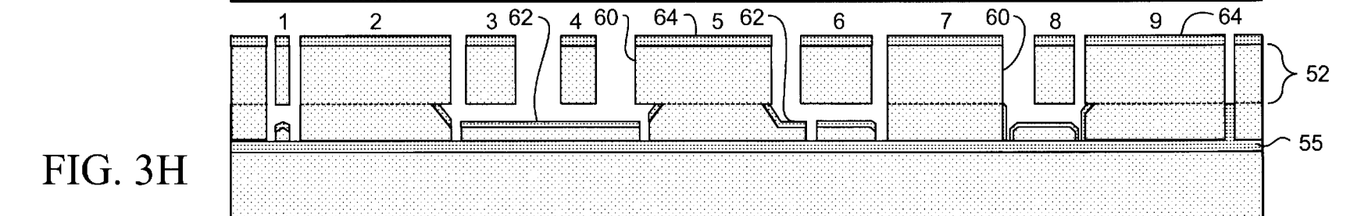
Figure 3I:
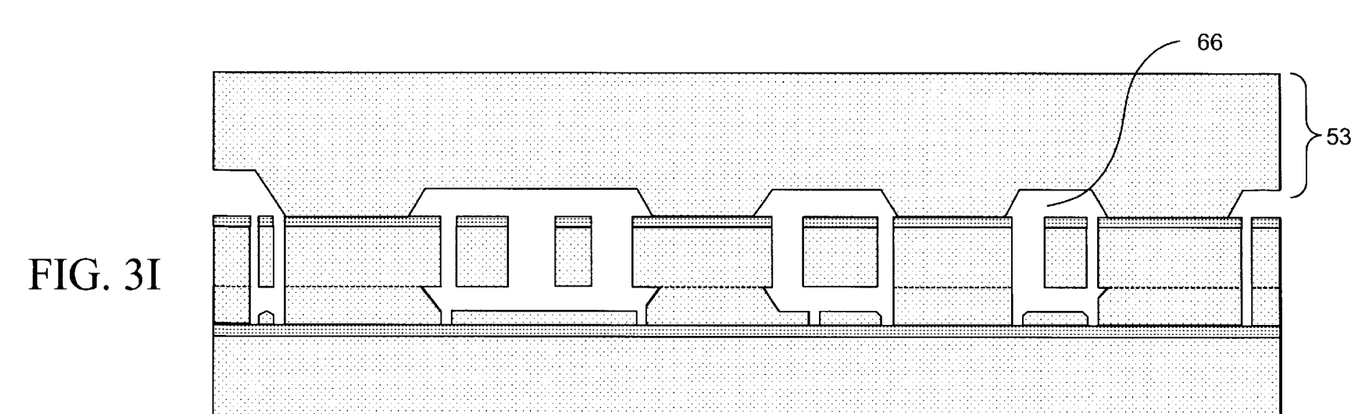

Referring now to FIGS. 3A through 3L in general, the process of fabrication involves three different silicon semiconductive wafers; a handle wafer 51, see FIG. 3A, a structural wafer 52, see FIG. 3F, and a capping wafer 53, see FIG. 3I.

The handle wafer 51 as illustrated in FIG. 3A is of the SIMOX type which is an acronym for separation by implanted oxygen. Thus, handle wafer 51 consists of a silicon base 54, implanted oxide 55 with a silicon overlayer 56 which has deposited on it a silicon nitride film 57. The purpose of the handle wafer is to produce cavities and anchor areas in the structural wafer 52 to be defined. Trenches (see FIG. 3L) through the silicon overlayer 56 provide physical electrical selection from one area to another. Vertical isolation is accomplished by the insulating oxide layer 55.

In addition to SIMOX an interior or buried insulating layer in a handle wafer 51 of the BESOI type (bonded and etched silicon on insulator) may be used.

In FIG. 3B the silicon nitride film 57 is patterned by etching out the spaces 57' using standard photolithographic techniques and a subsequent plasma nitride etch process.

Next, FIG. 3C, another photoresist layer 58 is applied to define trench areas 59; etching of the trenches is accomplished with a plasma ion etch process.

In FIG. 3D photoresist layer 58 is removed and cavities such as 61 are etched using wet isotropic etching techniques such as with potassium hydroxide. Note that the silicon nitride 57 serves as a mask for the cavities.

In FIG. 3E the cavities 61 of handle wafer 51 are oxidized as shown at 62 with an oxide layer.

In FIG. 3F the silicon nitride layer 57 is removed from the handle wafer 51 and a single crystal silicon structural wafer 52 is fusion bonded, the bonding interface line being indicated at 63.

As illustrated in FIG. 3G the structural wafer 52 is ground and polished to the proper thickness. Such thickness would be a dimension of at least 10 and typically 70 microns to provide the fingers as illustrated in FIG. 4 and 5 of the drive and integrated combs and parallel plate sensing capacitor.

In FIG. 3H, after growing silicon oxide 64 on wafer 52 which serve as an etch mask, by a vertical plasma etch 60, the structural layer 52 is etched through its entire thickness effectively down to the oxidized cavity surface 62. Besides stopping any further etching, this oxide layer in combination with layer 55 electrically isolates various elements of the rate sensor.

The structural wafer 52 as illustrated in FIG. 3H is now effectively the completed structure shown in FIG. 2. The numbers 1 through 9 on the structural wafer are the elements that correspond to those in FIG. 2. Specifically, element 1 is a ground anchor; elements 2 and 9, the anchors for the interdigitated drive combs, these drive anchors include the relatively thick fingers shown in FIG. 4; elements 3 and 8 is the suspended exterior mass.

The portions 4 and 6 show the inner mass 42 with element 5 being the sense anchor. Finally, element 7 shows the various structural anchors for mass 42 which includes the parallel plate sensing capacitors.

In FIG. 3I, to protect the structural wafer, a silicon capping wafer 53 has complimentary cavities 66 etched and then is bonded to the structural wafer 52. This bond is performed in a vacuum to minimize damping of the masses.

Figure 3J:
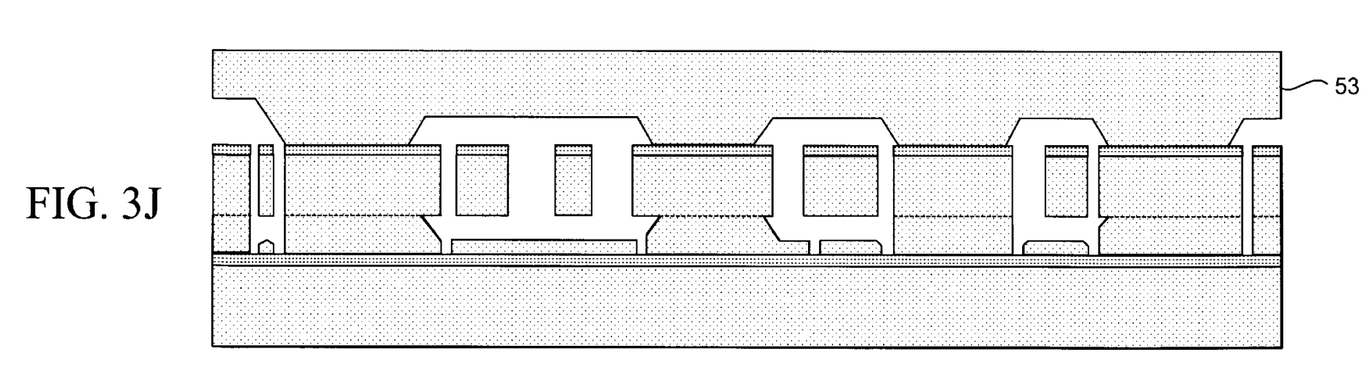

In FIG. 3J, capping wafer 53 is ground and polished.

Figure 3K:
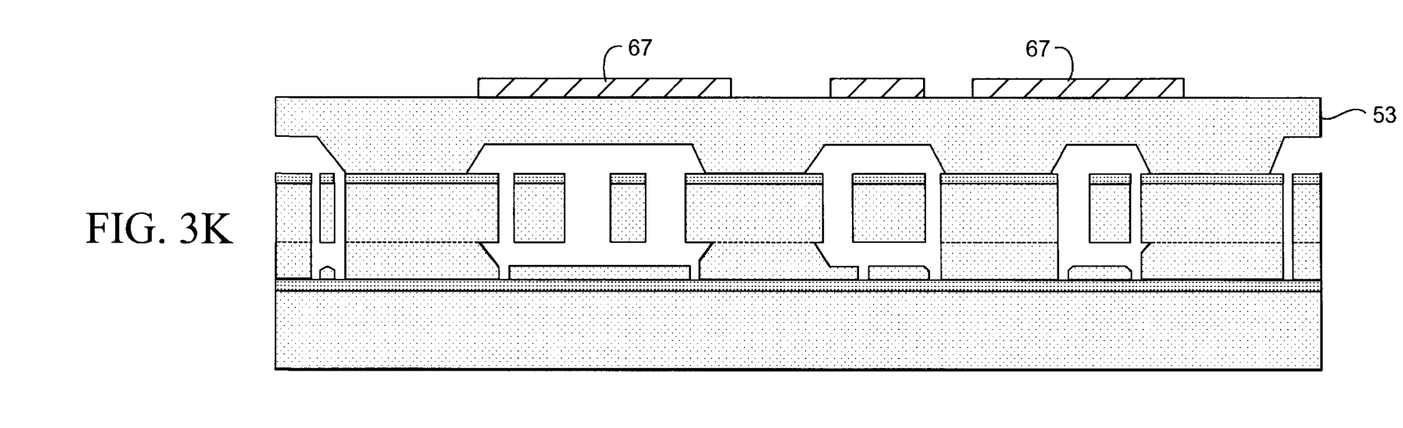

Since in the present invention the rate sensor is part of an overall integrated circuit, as illustrated in FIG. 3K, the integrated circuit 67 is actually integrated on the top of capping wafer 53.

Figure 3L:
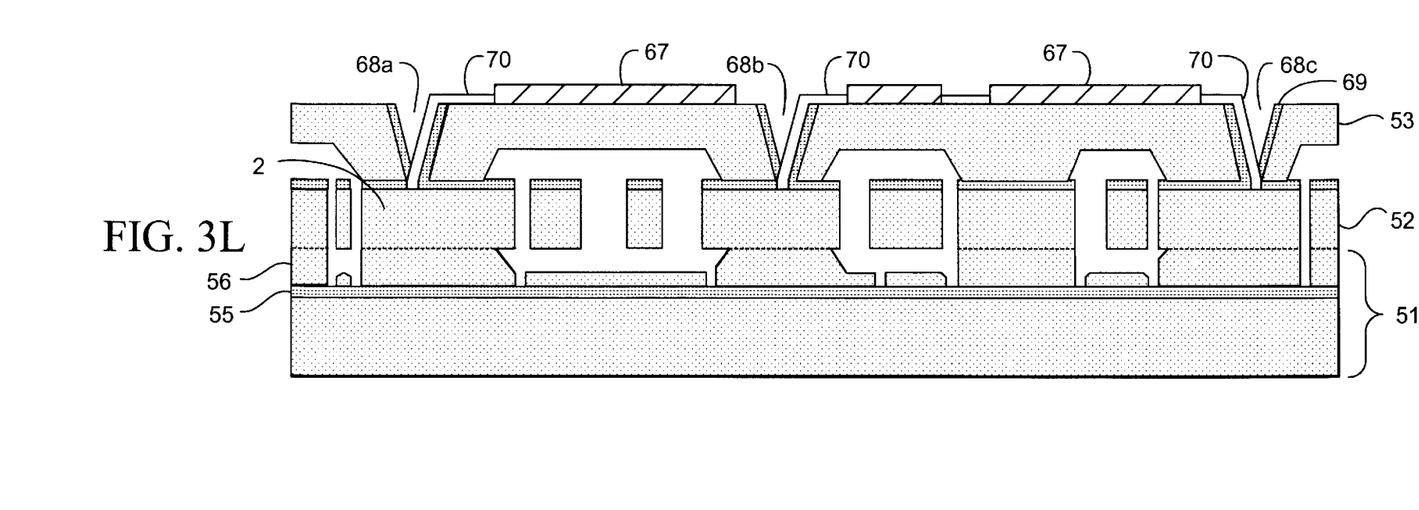

Then, as illustrated in FIG. 3L, to interconnect the circuit 67 to the structural wafer 51 (that is the sensing and drive electrodes) capping wafer 53 is etched to the structural wafer 52 at certain pass-through points or vias 68*a, b, c*. The vias are oxidized 69 and metal 70 is deposited to electrically connect the structural wafer at the proper points. Note for example at the first via 68*a* there is a connection made to the drive anchor 2 where, of course, the drive signal must be applied.

To adapt the above method of FIGS. 3A through 3L to the embodiment of FIG. 1 is relatively straightforward in that the same type of mass structure is used along with interdigitated drives and sensors and support beams.

What is claimed is:

1. An angular rate sensor comprising:

a structural wafer composed of single crystal silicon and having a pair of proof masses which are part of a rotating reference frame, said masses lying substantially in an X-Y plane orthogonal to a Z input axis of rotation;

interdigitated means included in said structural wafer for driving said masses into oscillation in an X or Y direction;

frame means included in said structural wafer in said X-Y plane for supporting said masses and allowing opposing Coriolis induced forces to rotate said frame, the rotation of said frame being indicative of said angular rate of said sensor;

parallel plate sensing means located outside of said frame also in said X-Y plane for sensing said rotation of said frame.

2. An angular rate sensor in claim 1 where said sensing means includes an axially opposed pair of sensors for differentially sensing said rotary motion of said frame.

3. An angular rate sensor as in claim 1 where said frame is circular and is supported at a plurality of points.

4. An angular rate sensor as in claim 1 including a silicon handle wafer bonded to said structural wafer to eliminate temperature differential expansion effects.

* * * * *